(12) United States Patent
Schmitt et al.

(10) Patent No.: US 12,409,824 B1
(45) Date of Patent: Sep. 9, 2025

(54) DRIVE-BY-WIRE VEHICLE ARCHITECTURE

(71) Applicant: Gatik AI Inc., Mountain View, CA (US)

(72) Inventors: Alexander Schmitt, Mountain View, CA (US); Andreas Bauer, Mountain View, CA (US); Apeksha Kumavat, Mountain View, CA (US); Gautam Narang, Mountain View, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 18/990,966

(22) Filed: Dec. 20, 2024

(51) Int. Cl.
*B60T 13/26* (2006.01)
*B60T 7/04* (2006.01)
*B60T 7/12* (2006.01)
*B60T 13/66* (2006.01)

(52) U.S. Cl.
CPC ............ *B60T 13/662* (2013.01); *B60T 7/042* (2013.01); *B60T 7/12* (2013.01)

(58) Field of Classification Search
CPC ............ B60T 13/683; B60T 2270/402; B60T 2270/413; B60T 7/12; B62D 33/067; B62D 5/0409; B62D 5/0415
See application file for complete search history.

(56) References Cited

U.S. PATENT DOCUMENTS

| | | | |
|---|---|---|---|
| 4,743,817 A * | 5/1988 | Shimizu | H02K 23/66 318/489 |
| 5,120,114 A * | 6/1992 | Schlichenmaier | B60T 8/323 188/112 A |
| 5,211,449 A * | 5/1993 | Amtsfeld | B60T 8/327 303/9.66 |
| 5,575,543 A * | 11/1996 | Pheonix | B60T 13/683 303/155 |
| 6,048,040 A * | 4/2000 | Ross | B60T 8/3605 303/127 |
| 6,082,835 A * | 7/2000 | Brearley | B60T 17/221 303/169 |
| 6,183,052 B1 * | 2/2001 | Harada | B60T 13/683 303/140 |
| 6,278,965 B1 | 8/2001 | Glass et al. | |
| 6,292,830 B1 | 9/2001 | Taylor et al. | |
| 7,230,545 B2 | 6/2007 | Nath et al. | |
| 7,284,802 B2 * | 10/2007 | Ziegler | B60T 8/4818 303/146 |
| 8,024,112 B2 | 9/2011 | Krumm et al. | |

(Continued)

FOREIGN PATENT DOCUMENTS

| | | |
|---|---|---|
| JP | 2012531340 A | 12/2012 |
| JP | 2015089801 A | 5/2015 |

(Continued)

OTHER PUBLICATIONS

"ApolloAuto/apollo Planning", GitHub, https://github.com/ApolloAuto/apollo/blob/master/modules/planning/README.md.

(Continued)

*Primary Examiner* — Bradley T King
(74) *Attorney, Agent, or Firm* — Jeffrey Schox; Diana Lin

(57) ABSTRACT

In variants, the vehicle can provide redundant drive by wire subsystems that are operable in both an autonomous (AV) mode and manual driving modes.

19 Claims, 7 Drawing Sheets

(56) References Cited

U.S. PATENT DOCUMENTS

| | | |
|---|---|---|
| 8,737,986 B2 | 5/2014 | Rhoads et al. |
| 9,507,346 B1 | 11/2016 | Levinson et al. |
| 10,106,153 B1 | 10/2018 | Xiao et al. |
| 10,311,336 B1 | 6/2019 | Kim et al. |
| 10,330,787 B2 | 6/2019 | Melvin et al. |
| 10,520,940 B2 | 12/2019 | Palanisamy et al. |
| 10,559,140 B2 | 2/2020 | Nix et al. |
| 10,860,022 B2 | 12/2020 | Korchev et al. |
| 10,866,588 B2 | 12/2020 | Buch et al. |
| 11,027,751 B2 | 6/2021 | Wray et al. |
| 11,034,364 B1 | 6/2021 | Narang et al. |
| 11,124,204 B1 | 9/2021 | Narang et al. |
| 11,157,010 B1 | 10/2021 | Narang et al. |
| 11,282,013 B2 | 3/2022 | Rana et al. |
| 11,294,387 B2 | 4/2022 | Northcutt et al. |
| 11,396,302 B2 | 7/2022 | Ye et al. |
| 11,454,970 B2 | 9/2022 | Sujan et al. |
| 11,468,395 B2 | 10/2022 | Javidan et al. |
| 11,491,979 B2 | 11/2022 | Wang |
| 11,521,396 B1 | 12/2022 | Jain et al. |
| 11,685,360 B2 | 6/2023 | Frazzoli et al. |
| 11,747,155 B2 | 9/2023 | Wang et al. |
| 11,753,008 B2 | 9/2023 | Lin et al. |
| 11,774,963 B2 | 10/2023 | Huang et al. |
| 11,789,456 B2 | 10/2023 | Tan et al. |
| 12,257,994 B2 * | 3/2025 | Nemeth .................. G09G 5/00 |
| 2006/0119174 A1 * | 6/2006 | Frashure .............. B60T 8/1708 |
| | | 303/DIG. 9 |
| 2006/0244626 A1 * | 11/2006 | Beyene .................. F02N 15/10 |
| | | 340/6.1 |
| 2008/0312833 A1 | 12/2008 | Greene et al. |
| 2009/0306866 A1 | 12/2009 | Malikopoulos |
| 2010/0131148 A1 | 5/2010 | Camhi et al. |
| 2012/0035801 A1 * | 2/2012 | Browne .............. B62D 5/0487 |
| | | 324/418 |
| 2012/0232733 A1 | 9/2012 | Herbin et al. |
| 2013/0158801 A1 * | 6/2013 | Tober .................. B60T 13/683 |
| | | 701/41 |
| 2013/0274986 A1 | 10/2013 | Trepagnier et al. |
| 2015/0100530 A1 | 4/2015 | Mnih et al. |
| 2016/0161267 A1 | 6/2016 | Harada |
| 2016/0318515 A1 | 11/2016 | Laur et al. |
| 2017/0113686 A1 | 4/2017 | Horita et al. |
| 2017/0135621 A1 | 5/2017 | Lee et al. |
| 2017/0345181 A1 | 11/2017 | Yu et al. |
| 2018/0198733 A1 | 7/2018 | Iandola et al. |
| 2018/0196439 A1 | 7/2018 | Levinson et al. |
| 2018/0208166 A1 * | 7/2018 | Eckert .................... B60T 8/327 |
| 2018/0232585 A1 | 8/2018 | Kim |
| 2018/0339709 A1 | 11/2018 | Tiwari et al. |
| 2019/0033085 A1 | 1/2019 | Ogale et al. |
| 2019/0035275 A1 | 1/2019 | Nishi |
| 2019/0084571 A1 | 3/2019 | Zhu et al. |
| 2019/0145784 A1 | 5/2019 | Ma et al. |
| 2019/0146492 A1 | 5/2019 | Phillips et al. |
| 2019/0146508 A1 | 5/2019 | Dean et al. |
| 2019/0147255 A1 | 5/2019 | Homayounfar et al. |
| 2019/0168724 A1 * | 6/2019 | VandenBerg, III ..... B60T 8/171 |
| 2019/0176843 A1 | 6/2019 | Jones et al. |
| 2019/0241198 A1 | 8/2019 | Mori et al. |
| 2019/0311298 A1 | 10/2019 | Kopp et al. |
| 2019/0315351 A1 | 10/2019 | Smith et al. |
| 2019/0317496 A1 | 10/2019 | Korchev et al. |
| 2019/0329763 A1 | 10/2019 | Sierra Gonzalez et al. |
| 2019/0337502 A1 * | 11/2019 | Farres .................. B60T 15/027 |
| 2019/0337503 A1 * | 11/2019 | Otremba .............. B60T 13/662 |
| 2019/0354101 A1 | 11/2019 | Sujan et al. |
| 2019/0361454 A1 | 11/2019 | Zeng et al. |
| 2019/0378019 A1 | 12/2019 | Scheutz et al. |
| 2020/0004259 A1 | 1/2020 | Gulino et al. |
| 2020/0010061 A1 | 1/2020 | Tiwari et al. |
| 2020/0017080 A1 * | 1/2020 | Salvatora .............. B60T 8/266 |
| 2020/0026276 A1 | 1/2020 | Zhang et al. |
| 2020/0033855 A1 | 1/2020 | Jammalamadaka et al. |
| 2020/0033868 A1 | 1/2020 | Palanisamy et al. |
| 2020/0055515 A1 | 2/2020 | Herman et al. |
| 2020/0086862 A1 | 3/2020 | Cui et al. |
| 2020/0086863 A1 | 3/2020 | Rosman et al. |
| 2020/0133281 A1 | 4/2020 | Gomez Gutierrez et al. |
| 2020/0139975 A1 | 5/2020 | Ishikawa et al. |
| 2020/0143670 A1 | 5/2020 | Kitani et al. |
| 2020/0150672 A1 | 5/2020 | Naghshvar et al. |
| 2020/0174472 A1 | 6/2020 | Zhang et al. |
| 2020/0207339 A1 | 7/2020 | Neil et al. |
| 2020/0302322 A1 | 9/2020 | Tukiainen et al. |
| 2020/0326667 A1 | 10/2020 | Ahuja et al. |
| 2020/0346683 A1 * | 11/2020 | Okutani ............... B62D 5/0415 |
| 2020/0356828 A1 | 11/2020 | Palanisamy et al. |
| 2020/0363800 A1 | 11/2020 | Jojo-verge et al. |
| 2020/0385015 A1 | 12/2020 | Tsuda |
| 2021/0107498 A1 | 4/2021 | Liu et al. |
| 2021/0110484 A1 | 4/2021 | Shalev-shwartz et al. |
| 2021/0117760 A1 | 4/2021 | Krishnan et al. |
| 2021/0179146 A1 | 6/2021 | Nishida et al. |
| 2021/0201112 A1 | 7/2021 | Gauthier et al. |
| 2021/0255620 A1 | 8/2021 | Bielby et al. |
| 2021/0300405 A1 | 9/2021 | Hyde et al. |
| 2021/0304123 A1 | 9/2021 | Vanapalli et al. |
| 2021/0323523 A1 * | 10/2021 | Adler ........................ B60T 8/94 |
| 2021/0374502 A1 | 12/2021 | Roth et al. |
| 2021/0380132 A1 | 12/2021 | Narang et al. |
| 2021/0390353 A1 | 12/2021 | Futatsugi et al. |
| 2022/0001858 A1 | 1/2022 | Futatsugi et al. |
| 2022/0340115 A1 * | 10/2022 | Knosmann ................ B60T 7/20 |
| 2023/0177241 A1 | 6/2023 | Hasenklever et al. |
| 2023/0192126 A1 | 6/2023 | Kumavat et al. |
| 2023/0192139 A1 | 6/2023 | Kumavat et al. |
| 2023/0415721 A1 * | 12/2023 | Otremba .................. B60T 7/20 |
| 2024/0043064 A1 * | 2/2024 | Angenete ................. B62D 1/16 |
| 2024/0157920 A1 * | 5/2024 | Schwagmeyer ...... B60T 13/683 |
| 2024/0190410 A1 * | 6/2024 | Komandur ............ B60T 13/662 |
| 2024/0246520 A1 * | 7/2024 | van Thiel ................ B60T 13/22 |
| 2024/0317200 A1 * | 9/2024 | van Thiel .............. B60T 13/665 |
| 2024/0359727 A1 * | 10/2024 | Schoon ............... F16C 11/0604 |
| 2025/0050855 A1 * | 2/2025 | Hinricher ................ B60T 13/68 |
| 2025/0083648 A1 * | 3/2025 | van Thiel ............. B60T 8/1708 |

FOREIGN PATENT DOCUMENTS

| | | |
|---|---|---|
| JP | 2018205940 A | 12/2018 |
| JP | 2019055768 A | 4/2019 |
| JP | 2019131141 A | 8/2019 |
| WO | 2011000714 A1 | 1/2011 |
| WO | 2017159176 A1 | 9/2017 |
| WO | 2018198823 A1 | 11/2018 |
| WO | 2019122952 A1 | 6/2019 |
| WO | 2019142276 A1 | 7/2019 |
| WO | 2020090251 A1 | 5/2020 |
| WO | 2020100408 A1 | 5/2020 |

OTHER PUBLICATIONS

"F-Series Specification Sheet FFR 600 AMT", Isuzu, www.isuzu.co.za, Jul. 2021.

"Learning to Drive in a Day", https://www.youtube.com/watch?v=eRwTbRtnT11, Jul. 2, 2018.

"Learning to Drive in a Day", Wayve, in research, Jun. 28, 2018, https://wayve.ai/blog/learning-to-drive-in-a-day-with-reinforcement-learning/.

Cui, J., "A review on safety failures, security attacks, and available countermeasures for autonomous vehicles", Nov. 13, 2018; https://pureportal.coventry.ac.uk/en/publications/a-review-on-safety-failures-security-attacks-and-available-counte.

Dabboussi, Abdallah, "Dependability approaches for mobile environment: Application on connected autonomous vehicles", Diss. University Bourgogne Franche-Comté, 2019, submitted Mar. 12, 2020.

Grimmet, et al., "Integrating Metric and Semantic Maps for Vision-Only Automated Parking", 2015 IEEE International Conference on Robotics and Automation (ICRA), Washington State Convention Center, Seattle, Washington, May 26-30, 2015.

(56) References Cited

OTHER PUBLICATIONS

Guibas, et al., "Bounded Uncertainty Roadmaps for Path Planning", IN Proc. Int. Workshop on the Algorithmic Foundations of Robotics, 2008.

Karmakar, et al., "Assessing Trust Level of a Driverless Car Using Deep Learning", IEEE Transactions of Intelligent Transportation Systems, vol. 22, No. 7, Jul. 2021.

Kendall, et al., "Learning to Drive in a Day", arXiv:1807.00412v2, Sep. 11, 2011.

Kuwata, et al., "Real-Time Motion Planning With Applications to Autonomous Urban Driving", IEEE Transactions On Control Systems Technology, vol. 17, No. 5, Sep. 1, 2009.

Liu, et al., "Computing Systems for Autonomous Driving: State-of-the-Art and Challenges", Dec. 7, 2020 ; https://arxiv.org/abs/2009.14349.

Loquercio, et al., "A General Framework for Uncertainty Estimation in Deep Learning", IEEE Robotics and Automation Letters PP(99):1-1, Feb. 2020.

Rastgoftar, et al., "A Data-Driven Approach for Autonomous Motion Planning and Control in Off-Road Driving Scenarios", 2018 American Control Conference (ACC), IEEE, 2018, May 2018.

Schwarting, et al., "Planning and Decision-Making for Autonomous Vehicles", Annual Review of Control, Robotics, and Autonomous Systems, Jan. 12, 2018, pp. 187-210.

Wu, Chien-Hsun, "Mechatronics and Remote Driving Control of the Drive-by-Wire for a Go Kart", Feb. 23, 2020; https://www.mdpi.com/1424-8220/20/4/1216.

\* cited by examiner

DRIVE-BY-WIRE VEHICLE ARCHITECTURE

TECHNICAL FIELD

This invention relates generally to the vehicle field, and more specifically to a new and useful redundant drive by wire vehicle architecture in the vehicle field.

DETAILED DESCRIPTION

The following description of the embodiments of the invention is not intended to limit the invention to these embodiments, but rather to enable any person skilled in the art to make and use this invention.

1. Overview

Figure 1:
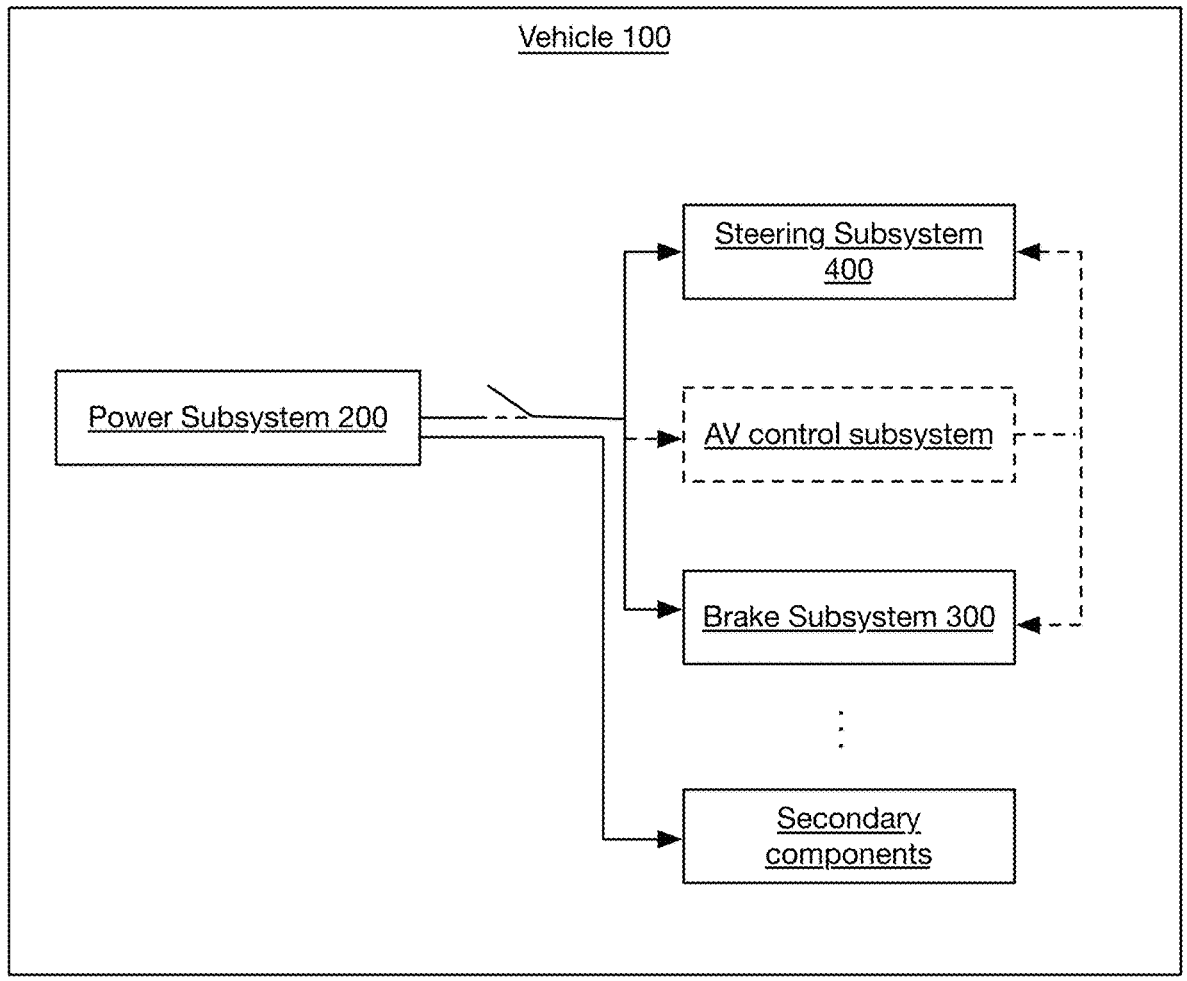
FIG. 1 is a schematic representation of a variant of the system.

As shown in FIG. 1, the vehicle 100 can include a power subsystem 200; brake subsystem 300; steering subsystem 400 and/or any other suitable components. Variants of the vehicle function to provide redundant, drive-by-wire infrastructure for autonomous control.

In variants, the vehicle can include a redundant drive by wire system that is operable in both an autonomous (AV) mode and manual driving modes. Both modes can control the same subset of components through parallel control paths, wherein the AV mode controls the vehicle subsystems using electrical signals and the manual mode controls the vehicle subsystems using physical and/or mechanical signals. In variants, the AV system actively commands an intermediate intermediary active component to mechanically drive downstream components, and the manual mode provides mechanical inputs into the intermediary active component to drive the same downstream components. In an example, the front braking system can include a proportional relay valve (e.g., the intermediate active component) that receives an electrical command signal from a front ECU, receives a pneumatic command signal (e.g., indirectly) from the driver input (e.g., brake pedal), and controls the pressure provided to the front brake chambers based on the dominant signal between the electrical and pneumatic command signals. In examples, the front braking system can be provided with command redundancy by having a rear ECU command a redundant pressure signal from a proportional valve, wherein the redundant pressure signal is arbitrated with the driver input signal by a solenoid that generates the pneumatic command signal that is provided to the proportional relay valve. In examples, the rear brake system can include a proportional relay valve that provides brake pressure to the rear brake chambers based on the rear ECU control signal. Rear brake redundancy can be mechanically provided by the front brake system via a rear spring brake system (e.g., redundant with the rear pneumatic brake chambers), wherein the front brake line is tied into the spring brake's control valve (e.g., parking brake valve). In this example, the spring brake engages the rear wheels when the pressure differential between the front and rear brake lines exceeds a predetermined threshold (e.g., when the rear brake line leaks or when the rear ECU commands a lower braking pressure). In examples, the steering system can include an EPAS unit, mechanically connected inline with a hydraulic gearbox, that receives an electronic input from an ECU, receives a mechanical input from the steering wheel, and generates a steering torque for the hydraulic gearbox based on a dominant command between the electronic input and the mechanical input. In variants, the EPAS unit can be connected to the steering wheel and the hydraulic gearbox by an upper and lower universal joint, respectively, which allows the steering assembly to tilt with the cab. However, the vehicle can be otherwise configured.

The vehicle 100 can include: a power subsystem 200; brake subsystem 300; steering subsystem 400 and/or any other suitable components. The vehicle 100 functions to operate autonomously, in a manual mode, and/or in any other mode. The vehicle 100 can be a truck, car, and/or other vehicle type. The vehicle 100 can be a class 6 or class 7 truck, but can alternatively be a class 1, 2a, 2, 3, 4, 5, 8, and/or other track class.

In variants, the vehicle 100 can be a cabover truck. In an example, the cabover truck can include a cab positioned directly above and forward of the chassis frame, with the driver compartment situated over the engine and front axle assembly. This configuration places the steering wheel and driver controls substantially vertically above the steering gearbox and requires universally-jointed steering shafts to accommodate the angular displacement between the cab and chassis components when the cab is actuated (e.g., opened to access the engine). In variants, the vehicle 100 can have a variable length chassis (e.g., variable length vehicle). In a specific example, the vehicle can be an Isuzu F-series box truck.

The vehicle can include a truck cab, chassis, truck body, and/or any other suitable components. The truck cab can mount the sensor assembly, processing units, vehicle controls, driver inputs, and/or any other suitable components. The truck cab can define a cabin for a driver, and/or any other suitable spaces. The chassis can be mounted to the truck cab (e.g., wherein the truck cab sits on top of the chassis), and/or any other suitable mounting configurations. The truck cab can tilt relative to the chassis (e.g., to provide engine access, etc.), but can alternatively be static relative to the chassis.

The vehicle is preferably autonomous, but can alternatively be partially autonomous or non-autonomous (e.g., wherein the vehicle provides redundant drive-by-wire and mechanical vehicle control systems), and/or any other suitable autonomy configuration. The vehicle can be level 1, 2, 3, 4, 5, or non-autonomous. The vehicle can be operable based on a set of control instructions, based on driver inputs, and/or any other suitable operational basis. The control instructions can be generated locally (e.g., onboard the vehicle, by one or more of the ECUs, etc.), remotely (e.g., by a teleoperator, by a cloud computing system, etc.), and/or any other suitable generation location. The control instructions can be generated based on sensor data (e.g., sampled by sensor systems onboard the vehicle, sampled by external sensors, etc.), operation goals (e.g., automatically determined by the AV system, determined by a passenger, determined by an operator, etc.), and/or any other suitable generation basis.

The vehicle can include one or more vehicle subsystems (e.g., example shown in FIG. 1). The vehicle subsystems can function to enable vehicle interaction with the physical environment. The vehicle subsystems can include: a power subsystem 200, brake subsystem 300, steering subsystem 400, and/or other vehicle control subsystems. Each vehicle subsystem can include: AV components (e.g., components that are actively controlled in the AV mode) and/or secondary components (e.g., passive components, components that are powered in the manual mode, non-AV components, etc.). The components can include: mechanical inputs (e.g., steering wheel, pedals, buttons, etc.), processing systems (e.g., ECUs, etc.), actuators (e.g., EPAS, linear actuators, solenoids, proportional valves, etc.), switches (e.g., disconnect switch), and/or any other suitable components. Different subsystems can share components (e.g., ECUs) or have discrete components.

The vehicle can include an AV system. The AV system can include: an AV control system, AV components within each subsystem (e.g., actively controlled components, components with electrical data inputs, etc.), and/or any other suitable components.

The AV control system can function to electronically control AV system operation. The AV control system can generate electronic control signals to actuate AV components within each subsystem. The AV control system can be local (e.g., mounted on the vehicle) or remote (e.g., a cloud computing system, a teleoperator, etc.). The AV control system can generate the control instructions based on vehicle sensor data (e.g., local measurements), external measurements, a goal (e.g., destination, etc.), remote instructions, and/or any other suitable inputs. The vehicle preferably includes one AV control system per vehicle, but can alternatively include multiple per vehicle. The AV control system can control the vehicle (e.g., vehicle subsystems, AV components within the vehicle subsystems) based on AV actions determined using all or portions of the methods described in: U.S. application Ser. No. 18/225,319 filed Jul. 24, 2023, U.S. application Ser. No. 18/654,315 filed May 3, 2024, U.S. application Ser. No. 18/096,695 filed Jan. 13, 2023 and/or U.S. application Ser. No. 18/075,778 filed Dec. 6, 2022, wherein each of which is incorporated herein in its entirety by this reference.

The AV control system can include a set of processing systems connected to one or more of the vehicle subsystems. In a first variant, the AV control system includes a different subset of processing systems for each subsystem. In a second variant, the same set of processing systems can control all subsystems. In a third variant, a subset of the processing system set can be shared between subsystems. The processing systems can be connected via a wired connection (e.g., CAN bus connection, serial bus connection, etc.), wireless connection (e.g., cellular connection, WiFi connection, NFC, Bluetooth, etc.), and/or any other suitable connection to the respective subsystems. The set of processing systems can include: electronic control units (ECUs), microprocessors, ASICs, CPUs, GPUs, and/or any other suitable processing systems.

The AV components can function as active inputs to each vehicle subsystem. The AV components can include the active components within each subsystem (e.g., components that are electrically powered, components with an analog or digital electrical signal input, etc.), and/or any other suitable components. Each subsystem can include one or more AV components. Examples of AV components can include: solenoid valves (e.g., 3/2 solenoid valve), pneumatic relay valves, and pneumatic valves in the brake subsystem, the EPAS unit and/or hydraulic gearbox in the steering subsystem, and/or any other suitable components.

The vehicle can be operable between an AV mode and a manual mode. In the AV mode (e.g., active mode), active components (e.g., the AV components, drive by wire components, etc.) are actively controlled (e.g., electronically controlled) by the AV control system. The control can be implemented by onboard processing systems (e.g., ECUs, processing systems running AV control discussed above, etc.), remote processing systems (e.g., cloud-based control, teleoperator stations, etc.), and/or other processing systems. In examples, in the AV mode, the AV control system: controls steering by sending angle commands to the electronic power steering unit (e.g., inserted inline into the steering assembly, between the manual input and the primary gearbox), controls braking by sending pressure commands to active relay valves and proportional valves, controls shifting by overriding the shift-by-wire selector signals or manual torque inputs, controls the engine sending torque requests to the engine (e.g., over the CAN bus), and/or otherwise actively controls the vehicle subsystems.

The AV components can be redundant (e.g., include multiple instances that are redundantly connected to the same control endpoint), fail operational (e.g., failover to direct mechanical coupling upon power loss or electronic failure, thereby providing passive mechanical redundancy for the vehicle), and/or otherwise provide operational redundancy, or not include any redundancy.

In an example, the steering angle is mechanically controlled by an EPAS unit that maintains a mechanical connection between the EPAS unit input and the EPAS unit output, where both the AV control system and a manual input connected to the EPAS unit can mechanically set the steering angle at the EPAS output (e.g., such that mechanical control is passively maintained in the event of an AV control system failure). In another example, the brake subsystem is pneumatically controlled, wherein brake pressure within the brake lines is regulated by a set of actuated relay valves, where both the AV control system and a pressure input (e.g., fluidly connected to the brake pedal) can mechanically set the brake line pressure (e.g., such that mechanical control is passively maintained in the event of an AV control system failure).

In another example, the AV components can be controlled by redundant ECUs that share all or a portion of the overall functionalities, communicate with each other and supervise each other (e.g., through a CAN architecture), are connected to all or a majority of the same control endpoints, are connected to redundant sensors (e.g., different sensors) or the same sensors, and/or any other suitable configuration. In another example, ECUs can be redundantly connected to the same subsystem (e.g., at different points along the subsystem stack) to redundantly monitor or control the subsystem. In this example, the ECU can control different parts of the same assembly to generate the same output; when the ECU is properly connected, the signals do not conflict, but when one of the ECU connections fails, the ECU is still able to control the assembly via the redundant connection. However, the AV components and/or AV component control can be otherwise redundant. Alternatively, each component can be controlled by a single control system (e.g., single ECU), each component can be controlled by different ECUs, and/or be otherwise controlled.

The AV control system can receive vehicle state information from vehicle sensors, wherein the vehicle sensors can include AV sensors (e.g., that are only used for AV operation), default mode sensors (e.g., that are used during AV mode and manual mode), and/or other sensors. In variants, all available sensor information can be used by the AV system; alternatively, only the AV sensors are used during the AV mode (e.g., the default sensors are not used during the AV mode). The AV mode can be engaged when the main disconnect switch is connected (e.g., automatically, manually, etc.), when a remote engagement instruction is received, when the AV system's perception confidence exceeds a predetermined threshold, and/or when another condition is satisfied. The AV mode can be disengaged when a manual input is received at the vehicle's manual control inputs (e.g., steering wheel torque, brake pedal actuation, throttle input actuation, etc.), when the emergency disengage button is pressed, when a remote disconnect signal is received, when a fault condition occurs (e.g., the confidence level of the control models fall below a threshold confidence for a threshold period of time, etc.), after the vehicle has automatically pulled over, after the vehicle has automatically stopped, and/or when another condition is satisfied. In examples, when disengagement occurs, the vehicle enters an MRC (minimum risk condition) state where the system alerts the driver to take over control.

The manual mode can be available when the AV mode is unavailable (e.g., when the AV system is offline, disconnected from power, has a failure, has been manually disengaged, etc.), when the AV mode is available (e.g., when the AV system is online, connected to power, etc.), and/or when another condition is satisfied. In the manual mode, vehicle subsystems can be mechanically controlled (e.g. manually controlled) using mechanical inputs on the vehicle, or controlled using a by-wire control intended for human operation. Components of the vehicle subsystems can be mechanically driven, cable-driven, electronically controlled (e.g., w/in the manual input generates a control signal instead of the AV processing system), and/or any other suitable control method. The mechanical inputs preferably control the same vehicle control endpoints as the AV control system via the same set of mechanical components in the manual mode, but can alternatively control the same endpoints using a different set of mechanical components (e.g., parallel set of components), or control different endpoints. In an example, the vehicle uses the same brakes, and the same fluid path (e.g., same set of valves, etc.), wherein active valves are depowered and are mechanically actuated based on the pressure generated by mechanical input actuation. In another example, the vehicle uses the same steering column, wherein the electronic power steering unit is depowered and transfers the mechanical input to the hydraulic gearbox using a mechanical connection (e.g., gearbox, etc.).

The power subsystem 200 can function to selectively power active components of the vehicle system and/or any other suitable components. The power subsystem 200 can power: the AV components (e.g., in the AV mode), secondary components (e.g., continuously, in the manual mode, etc.), and/or any other suitable components.

The power subsystem 200 can include a vehicle power source (e.g., battery, inverter, alternator, etc.), a secondary circuit, an AV circuit, a disconnect switch (e.g., example shown in FIG. 1), and/or other components.

The secondary circuit can be constantly powered during vehicle operation, or be selectively disconnectable from the vehicle power source. The secondary circuit can be electrically connected to the vehicle power source (e.g., permanently wired to the battery) and electrically connected to the secondary components. The secondary circuit can additionally or alternatively be electrically connected to a subset of the AV components (e.g., always-on components). In an example, the EPAS, shift-by-wire selector, and/or actuator, can remain powered but not autonomously controlled in the manual mode (e.g., because the ECUs are disconnected).

The AV circuit can be selectively powered during vehicle operation, continuously powered during vehicle operation, and/or otherwise powered. The AV circuit can be electrically connected to and control the AV components (e.g., EPAS unit, active brake valves, shift-by-wire system, engine control, etc.), and can optionally be electrically connected to the secondary components (e.g., solenoid, proportional relay valve, proportional valve, etc.). The AV circuit can be wired in parallel with the secondary circuit, but can alternatively be wired in series. The AV circuit can have a different wiring harness from the secondary circuit, but can alternatively share a wiring harness.

The disconnect switch is preferably part of the AV circuit, but can alternatively be part of the secondary circuit. The vehicle can include one or more disconnect switches. In a first example, when the AV circuit and the secondary circuit are wired in parallel, the vehicle includes a single disconnect switch between the AV circuit and the power source. In a second example, when the AV circuit and secondary circuit share a common circuit, the vehicle includes a set of disconnect switches arranged between the AV components and the power source (e.g., between a shared power bus and the AV component). However, the disconnect switch can be otherwise arranged.

The disconnect switch selectively electrically connects the AV circuit to the vehicle power source, wherein the AV system is electrically disconnected from the power source when the disconnect switch is open, and is electrically connected to the power source when the disconnect switch is closed. The disconnect switch can be actuated: manually (e.g., through the manual actuator), digitally (e.g., through a disengage or engage signal received from a remote computing system, etc.), and/or otherwise actuated. In variants, the disconnect switch can include or be connected to a manual actuator (e.g., button, key switch, brake pedal, etc.). The manual actuator can be located in the cab, located remote from the vehicle, and/or any other suitable location. The manual actuator can be mechanically connected (e.g., via a linkage, etc.), electrically connected, or otherwise connected to the disconnect switch, wherein actuation of the manual actuator can open and/or close the disconnect switch.

The vehicle can optionally include an e-stop controller that manages safety-critical power lines to components (e.g., brake solenoids, etc.), and can automatically default to a safe state if failures occur. The e-stop controller can be the same as or different from the disconnect switch.

The power subsystem 200 functions to power components of the vehicle. In variants, the power subsystem can enable a hybrid system operable in both manual and autonomous modes via a disconnect switch. When the disconnect switch is open (e.g., the AV system is off), the vehicle can be operated in manual mode, similar to a truck intended only for human operation. When the disconnect switch is closed (e.g., the AV system is on), the power subsystem 200 can power the AV components to enable autonomous vehicle (AV) functionality. This can enable the power subsystem 200 to support dual-mode operation, wherein untrained operators can drive the truck manually without special training in a first mode, and specially trained operators can enable autonomous operation in a second mode.

The power subsystem 200 can include a wiring harness that includes a chassis side and a cab side separated by a bulkhead connector.

The chassis side can include higher ingress protection against water, dust, dirt, and other environmental factors compared to the protected cab side. The chassis side can include: relay valves for the front and rear brakes, sensors (e.g., bumper, chassis, and/or axle IMUs), electrical shift units, communication interfaces to the engine, and/or other components.

The cab side can include components that are more sensitive to environmental factors, such as: the AV control system, power drivers, signal drivers, localization systems, brake relays, high-side output drivers, low-side driver outputs for auxiliaries (e.g., high/low beam actuation), mechanical inputs (e.g., buttons, switches, user interface, etc.), steering assembly, and/or other components.

The two sides can be separated by a bulkhead connector that routes all wiring between the chassis and cab.

However, the power subsystem 200 may be otherwise configured.

The brake subsystem 300 can function to control vehicle braking and/or any other suitable braking-related operations. The brake subsystem 300 can provide redundant drive-by-wire braking. In a specific example, the brake subsystem can be a redundant pneumatic brake system with dual actuation on the front axle and spring brake backup on the rear axle.

The brake subsystem 300 is preferably a pneumatic brake subsystem, but can alternatively be a hydraulic brake subsystem and/or any other suitable brake subsystem type. In a specific example, the brake subsystem 300 can be a pneumatic system with electronic control overlay for autonomous and manual operation modes.

The brake subsystem 300 can include a pressurization system, a set of brake chambers, a set of valves, a set of sensors, a set of ECUs, a set of driver inputs, a front brake subsystem 320, a rear brake subsystem 340, and/or any other suitable components.

The pressurization system can include a compressor, dehumidifier (e.g., desiccant, centripetal drier, heater, etc.), set of pressure reservoirs, and/or other components.

The set of pressure reservoirs can function to supply fluid to the front and rear brake subsystems. The vehicle can include one or more pressure reservoirs (e.g., front reservoir, rear reservoir, etc.). The pressure reservoirs can house and pressurize pressurization fluid. The pressurization fluid can include: air (e.g., wherein the pressure reservoir is a pneumatic reservoir), gas (e.g., nitrogen, etc.), liquid (e.g., hydraulic fluid, etc.), and/or any other suitable pressurization fluid. In an example, the vehicle can include multiple pressurization systems (e.g., a front pressurization system fluidly connected to the front brake circuit and a rear pressurization system fluidly connected to the rear brake circuit). However, the pressurization system: may be otherwise configured.

The set of brake chambers can function to apply brake force to a set of wheels and/or any other suitable braking targets. The set of brake chambers can apply brake force to one or more wheels and/or any other suitable braking surfaces. The set of brake chambers can include: one brake chamber per wheel (e.g., 4 brake chambers, etc.), redundant brake chambers for a wheel (e.g., rear wheel), one brake chamber per axle end, and/or any other suitable brake chamber configuration. The set of brake chambers can include one or more air brake chambers (e.g., pneumatic brake chambers), spring brakes, and/or any other suitable brake chambers.

The air brake chambers (e.g., pneumatic brake chambers) can function as service brakes (e.g., driving brakes), or be otherwise used. The vehicle can include one air brake chamber per wheel (e.g., 4 air brake chambers), one per axle, multiple per wheel, and/or any other suitable configuration of air brake chambers The spring brakes can be used for park and emergency brakes, or otherwise used. The spring brakes can be integrated with an air brake chamber or be separate from the air brake chamber. The spring brakes can apply spring force to the wheels when engaged. The spring brakes are preferably on the rear wheels, but can additionally or alternatively be on front wheels. The spring brakes can include one per wheel, one per axle, and/or any other suitable configuration. In an example, the vehicle can include one spring brake per rear wheel or rear wheel end. The spring brakes can be pneumatically controlled, hydraulically controlled, and/or any other suitable control method. The spring brakes can fail closed. The spring brakes can be controlled by: the emergency brake lever, using an anti-compounding system, and/or any other suitable control mechanism.

In a specific example, the spring brakes can be fluidly connected to both the front and rear brake lines via an inversion valve that is responsive to differential pressure between the front and rear brake lines. The pressure from the rear brake line (e.g., the primary pressure) biases the spring brake open, while the pressure from the front brake line biases the spring brake closed. During normal operation, the rear brake line pressure can counteract the front brake line pressure and/or the spring force; when both brakes are actuated (front and rear), both sides of the inversion valve are filled with pressure and the parking brake remains open. The front tied line is always filled with pressure, but the inversion valve only actuates when there is no pressure on the rear axle. This creates a piston-like action where loss of pressure in the rear axle causes the valve to modulate the spring brakes. When the rear brake line loses pressure (e.g., has less than a threshold pressure), the pressure differential biases the spring brake closed. In variants, the inversion valve can be connected to the front brake line at a point between a proportional relay valve (e.g., a final arbitration or control valve) and a front brake chamber, but can alternatively be fluidly connected to any other point in the front brake circuit.

However, the set of brake chambers may be otherwise configured.

The set of valves can function to control fluid flow and pressure within the vehicle and/or any other suitable fluid control functions. The set of valves can include one or more: passive valves, active valves, and/or any other suitable valve types. The set of valves can include one or more: solenoid valves (e.g., 3/2 solenoid valves), proportional relay valves, proportional valves, and/or any other suitable valve types. However, the set of valves may be otherwise configured.

The set of sensors can function to monitor air pressure. The set of sensors can include one or more pressure sensors, pressure monitoring devices, pressure measurement instruments, pressure detection components, and/or any other suitable pressure monitoring elements. The set of sensors can include multiple redundant sensors (e.g., triple redundant sensors) and/or any other suitable sensor configuration. The set of sensors can include one or more: pressure transducers, pressure switches, and/or any other suitable sensors. The set of sensors can include redundant monitoring capabilities for the AV system. In an example, the AV system can include triply redundant monitoring, wherein a given location in the pneumatic circuit can be monitored by a pressure transducer, a pressure switch, and a valve (e.g., active valve). The AV system can alternatively include other suitable redundant monitoring configurations for the brake subsystem. However, the set of sensors may be otherwise configured.

The set of ECUs can function to control brake operation by controlling active valve operation and/or any other suitable brake control operations. The set of ECUs can include 2 ECUs, but can alternatively include 1 ECU, more than 2 ECUs, and/or any other suitable number of ECUs. The set of ECUs can include: a microprocessor, ASIC, CPU, GPU, and/or any other suitable electronic control units. The set of ECUs can be specific to the brake subsystem, but can alternatively be shared with other subsystems. The ECUs within the set of ECUs are preferably redundant with each other (e.g., share more than 50%, 60%, 70%, 80%, 90%, etc. of functionalities), but can alternatively be not redundant. The redundant ECUs are preferably electrically isolated from each other (e.g., on different circuits), but can alternatively be on the same circuit. The set of ECUs can be mounted to the cab (e.g., in the cab), to the chassis (e.g., upper side, lower side, vertical side, etc.), to a brake bracket, adjacent the axles, and/or any other suitable mounting location. The set of ECUs can communicate with each other and/or AV components via a CAN bus (e.g., a dual-channel CAN bus, etc.), wirelessly (e.g., Bluetooth, etc.), and/or any other suitable communication method.

The set of ECUs can generate low-level brake control instructions based on control instructions, monitor brake subsystem health, and/or any other suitable functions. The control instructions can be: generated by the set of ECUs, received from a higher-level control system, received from a remote system (e.g., teleoperator, remote controller, etc.), and/or otherwise determined. The control instructions can be generated based on: the current vehicle state (e.g., sensor measurements, vehicle load, chassis length, etc.), anticipated vehicle state, external object state, vehicle goal, and/or any other suitable parameters.

The set of ECUs can receive digital signals, analog signals, and/or any other suitable signal types. The set of ECUs can generate digital signals, analog signals, and/or any other suitable signals. In a specific example, the set of ECUs can generate high side output (HSO) signals for proportional valve control.

The set of ECUs can include a front ECU and a rear ECU configured to control the front and rear brake subsystems (e.g., circuits), respectively. The front ECU can be electrically connected to the front brake actuators (e.g., valves, etc.). The rear ECU can be electrically connected to the rear brake actuators (e.g., valves) and at least one of the front brake actuators (e.g., to provide control redundancy). The front ECU can generate control instructions for the front brake subsystem, while the rear ECU can generate control instructions for both the front and rear brake subsystems (e.g., wherein conflicting front brake subsystem control signals between the front and rear ECU can be arbitrated by an active valve in the front brake subsystem). The front and rear ECUs can be mounted to the front and rear of the chassis, respectively (e.g., adjacent the front and rear axles, respectively), but can alternatively be mounted elsewhere.

The set of ECUs can optionally include a watchdog ECU configured to monitor the primary and secondary ECUs for system failures. The watchdog ECU can evaluate all the inputs, detect failure in data, plan minimum risk maneuvers, perform cybersecurity activities, and/or any other suitable monitoring functions.

However, the set of ECUs may be otherwise configured.

The set of driver inputs can function to enable a driver to manually control the brakes and/or any other suitable vehicle controls. The set of driver inputs can be connected to the same brake circuits or components (e.g., brake chambers, valves, etc.) as the set of ECUs, but can alternatively be connected to a different set of brake circuits and/or components. The set of driver inputs can include: a brake pedal mechanically connected to a treadle valve that is fluidly connected to the brake chambers, wherein brake pedal position regulates fluid flow through the treadle valve to regulate air pressure sent to brake chambers; a parking brake mechanically connected to a parking brake valve (e.g., inversion valve) that is fluidly connected to the spring brake; and/or any other suitable driver inputs.

However, the set of driver inputs may be otherwise configured.

In variants, the brake subsystem 300 can be split into a front brake subsystem 320 and a rear brake subsystem 340.

Figure 2:
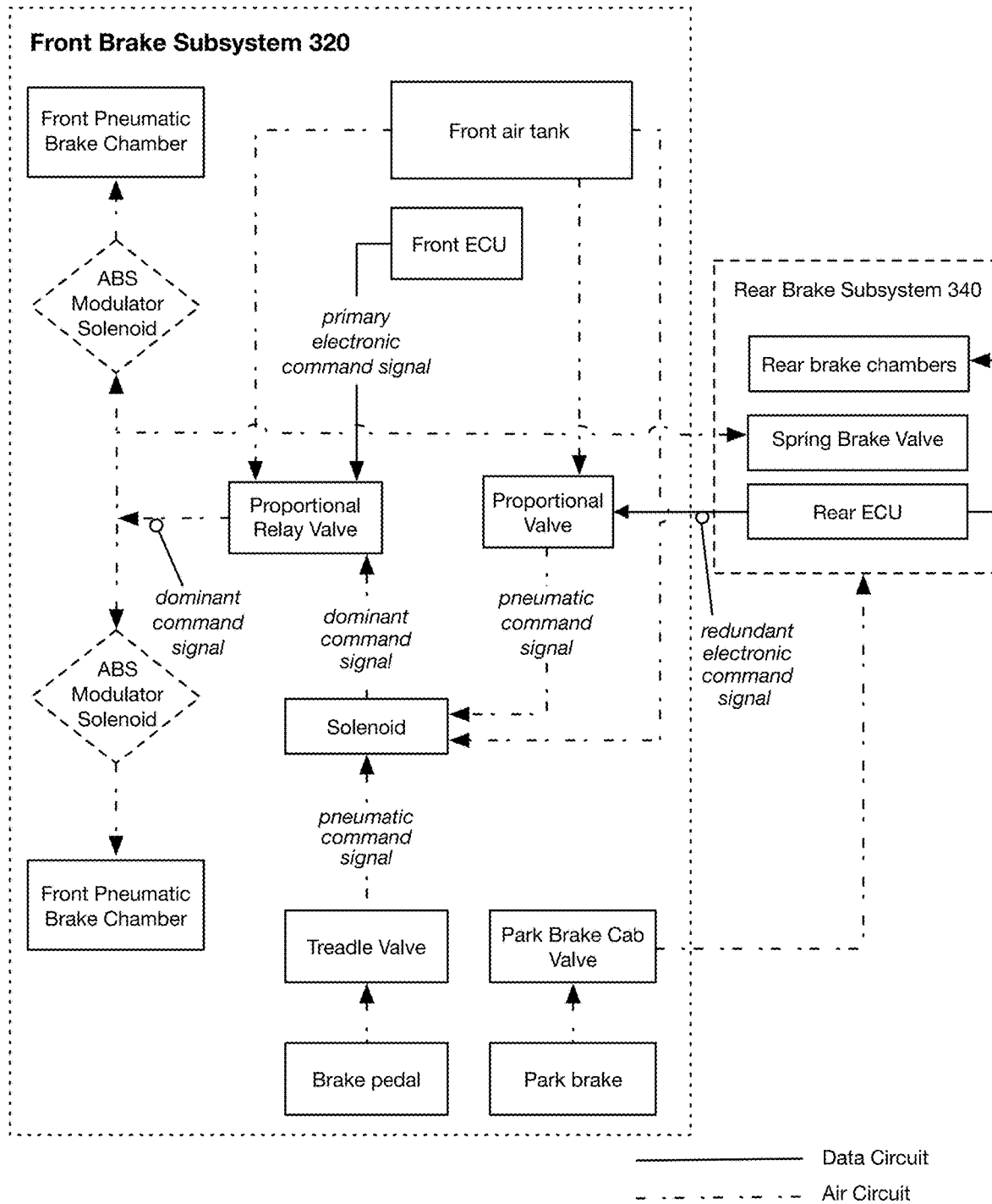
FIG. 2 is an illustrative example of a variant of a front brake subsystem.

The front brake subsystem 320 functions to control the front brakes (e.g., brake pressure in the front brake chambers) and/or any other suitable front brake parameters. The front brake subsystem 320 (e.g., front brake circuit, secondary circuit, etc.) can include: a brake pedal, front ECU, rear ECU, rear proportional valve, solenoid, front proportional relay valve, front brake chambers, front pressure reservoir, and/or any other suitable components (e.g., example shown in FIG. 2).

The brake pedal assembly can include a mechanical input (e.g., brake pedal), a treadle valve controlling pressure output based on the position of the mechanical input, and a fluid output (e.g., treadle valve output, pressure output, etc.). The brake pedal assembly can be configured to generate a pedal pressure signal (e.g., wherein brake pedal depression pressurizes the fluid output), a pedal travel signal (e.g. where an electronic signal is generated to represent the brake demand), a combination of the two, and/or other signal.

The front ECU can be configured to generate a front braking control signal based on AV control instructions. The front braking control signal can be based on a first set of inputs, wherein the first set of inputs can include: control instructions, sensor data (e.g., from the braking subsystem, from the front brake subsystem, from the rear brake subsystem, from the perception system, etc.), and/or any other suitable inputs. The front ECU can be mounted in proximity to the front axle and/or any other suitable location.

The rear ECU can be configured to generate a redundant front braking control signal based on AV control instructions (e.g., same AV control instructions as the front ECU), based on the same or different information as that used by the front ECU to generate the front braking control signal.

The front proportional valve can include an electrical input (data input) that is electrically connected to the rear ECU and a fluid output (e.g., pressure output). The front proportional valve can generate a rear pressure signal (e.g., redundant pressure signal) based on the rear ECU's electrical signals.

The solenoid (e.g., 3/2 solenoid) can include one or more fluid inputs (e.g., pressure inputs) fluidly connected to the fluid output of the brake pedal, an electrical input (data input) optionally electrically connected to the rear ECU, and a fluid output (e.g., pressure output). The solenoid can alternatively include a data input electrically connected to the rear ECU (e.g., controlled by the rear ECU). The solenoid can be configured to output a pressure signal based on the dominant pressure between the brake pedal and proportional valve (e.g., rear ECU). The pressure signal can be determined by decision logic within the rear ECU and/or using any other suitable controls.

The front proportional relay valve can include a fluid input (e.g., pressure input; redundant control input; driver control input; etc.) fluidly connected to the solenoid fluid output, an electrical input (data input) electrically connected to the front ECU, and a right and left fluid output (e.g., pressure outputs) fluidly connected to the left and right front brake chambers, respectively. The front proportional relay valve can provide a brake pressure to the brake chambers based on a dominant signal between the solenoid pressure signal (e.g., pressure signal from the front proportional relay valve's fluid input) and the front ECU's electrical signal.

The front pressure reservoir (e.g., pneumatic reservoir) can be mounted near the front axle and/or any other suitable location. All front brake subsystem valves can be fluidly connected to the front pressure reservoir as a pressure source (e.g., via a supply manifold, etc.).

In variants, the front brake subsystem 320 can be controlled through multiple control pathways. In this variant, a proportional relay valve connected to the front brake chambers outputs a pressure commanded by a dominant signal received from the front ECU (at a digital input of the proportional relay valve) and the redundant/manual pressure circuit (at a pressure input of the proportional relay valve). In the redundant/manual pressure circuit, the rear ECU sends signal to a digital input of a proportional valve with a fluid output fluidly connected to a first pressure input of a solenoid (e.g., 3/2 solenoid), wherein the proportional valve changes the output pressure based on the ECU input. A driver brake pedal (e.g., connected to a treadle valve) can be fluidly connected to a second pressure input of the solenoid, wherein driver brake pedal position changes the pressure of the second pressure input. The solenoid output is connected to the pressure input of the proportional relay valve, and outputs a control signal (pressure signal) generated based on a dominant pressure between the brake pedal and the rear ECU-commanded pressure to the proportional relay valve's pressure input. The front ECU controls a digital input of a proportional relay valve. The proportional relay valve can take the dominant pressure between the electrical input from the front ECU and the solenoid's pressure output (generated from rear ECU's digital input and/or the driver brake pedal's pressure input), and control the front brake chambers based on the dominant pressure (e.g., pressurize the front brake chambers to the dominant pressure).

When the vehicle switches to operation in the manual mode, the front and rear ECUs, the proportional valve, the solenoid, and the proportional relay valve can be depowered. The valves (e.g., proportional valve, solenoid, proportional relay valve, etc.) can remain functional through fluid pressure-based control controlled by the brake pedal.

The front brake subsystem 320 can also provide mechanical control redundancy for the rear brake subsystem. A brake line between the proportional relay valve and a brake chamber can be spliced to a spring brake (e.g., an inversion valve controlling the spring brake), wherein the spring brake can close when the pressure differential between the front and rear brake lines exceed a threshold.

The front brake subsystem 320 can include triple sensor redundancy, wherein the valves can function as sensors. In an example, the front brake subsystem 320 can include pressure transducers monitoring the brake chambers and a pressure switch monitoring the treadle valve, in addition to the active valves.

However, the front brake subsystem 320 may be otherwise configured.

The rear brake subsystem 340 functions to control rear brake operation.

Figure 3:
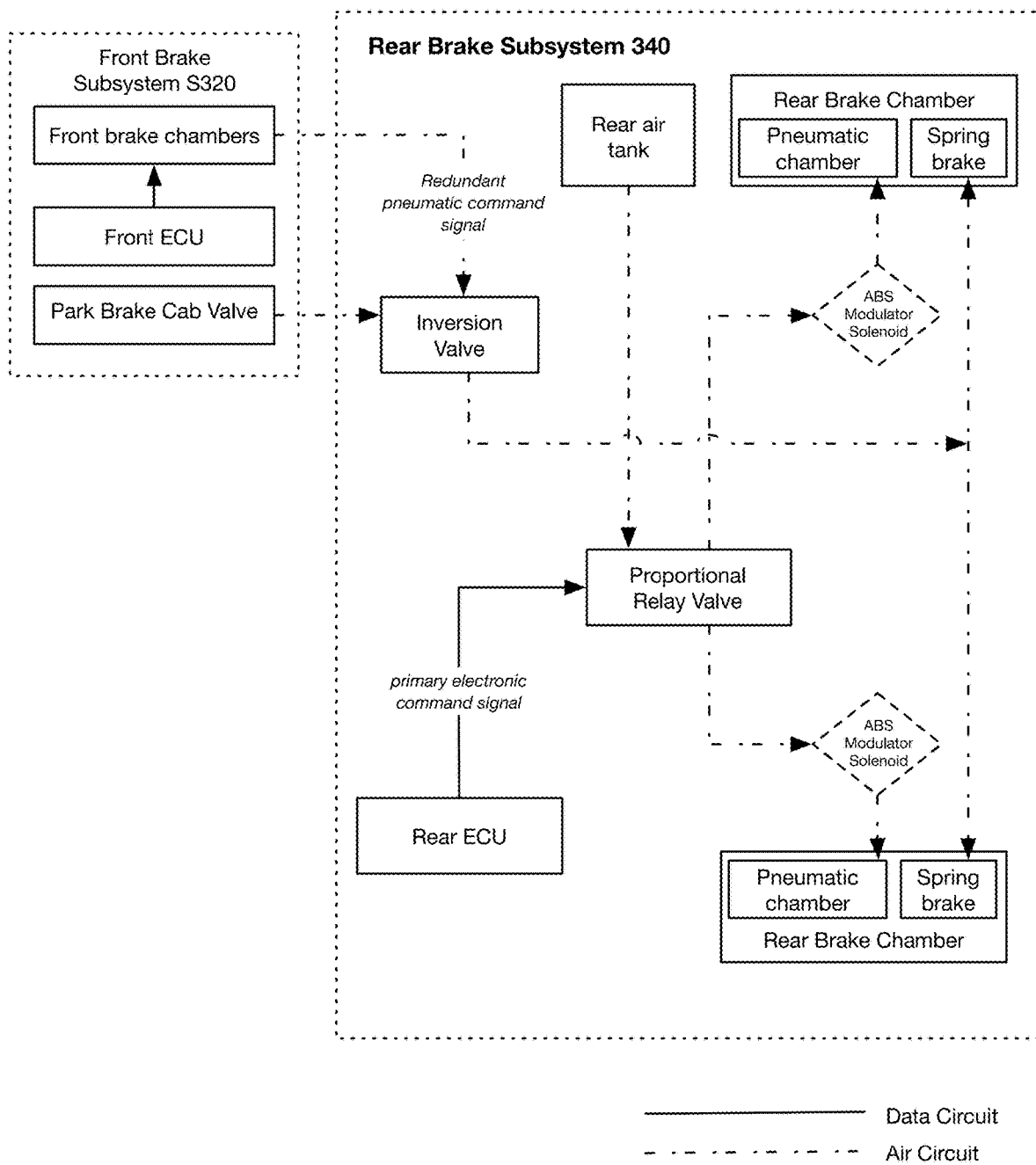
FIG. 3 is an illustrative example of a variant of a rear brake subsystem.

The rear brake subsystem 340 can include a rear air brake subsystem (e.g., rear brake circuit, primary circuit, etc.) comprising: rear ECU, rear proportional relay valve, rear brake chambers, spring brakes, rear pressure reservoir, and/or any other suitable components (e.g., example shown in FIG. 3).

The rear ECU can be configured to generate a rear braking control signal based on AV control instructions (e.g., same AV control instructions as the front brake subsystem, alternatively different AV control instructions, etc.). The rear ECU can be mounted on the rear brake bracket, and/or any other suitable location.

The proportional relay valve (e.g., EBS proportional relay valve) can include a fluid input (e.g., pressure input) fluidly connected to the brake pedal, an electrical input electrically connected to the rear ECU, and a right and left fluid output (e.g., pressure outputs) fluidly connected to the left and right rear brake chambers, respectively. The proportional relay valve can be configured to provide a brake pressure to the brake chambers based on a dominant signal between the brake pedal pressure signal and the rear ECU's electrical signal.

The spring brakes can be mechanically connected to the rear wheels (e.g., the spring brakes brake the rear wheels when engaged). The spring brakes can be integrated into the rear pneumatic brake chambers (e.g., one spring brake per brake chamber; forming a dual-chamber brake, etc.), or be separate from the rear pneumatic brake chambers. The spring brakes can be fluidly controlled by an inversion valve (e.g., park brake valve) fluidly connected to both the front and rear brake lines, wherein the front and rear fluid connections are teed off from circuit locations between the front and rear proportional relay valves and a front and rear brake chamber, respectively (e.g., downstream of the proportional relay valve outputs). However, the spring brakes can be controlled by a solenoid, relay valve, and/or other valve. The spring brakes can be controlled by a single valve or a combination of valves. The spring brakes can be fluidly connected to a park brake actuator (e.g., stalk, lever, pedal, etc.). In operation, the spring brake can be engaged when the park brake is actuated, when a differential between the front and rear brake line pressure exceeds a threshold (and/or when the rear brake line pressure drops to ambient), and/or otherwise engaged.

The rear pressure reservoir (e.g., pneumatic reservoir) can be fluidly connected to all or a subset of the rear brake subsystem components as a pressure source (e.g., via a supply manifold, etc.). The rear pressure reservoir can be mounted near the rear axle, and/or any other suitable location.

When the vehicle switches to operation in the manual mode, the rear ECU and the proportional relay valve can be depowered. The valves (e.g., proportional relay valve, etc.) can remain functional through fluid pressure-based control (e.g., through the fluid connection to the brake pedal and parking brake), and/or through other control methods.

The rear brake subsystem 340 can include triple sensor redundancy, wherein the valves can function as sensors. In an example, the rear brake subsystem 340 can include pressure transducers monitoring the brake chambers (e.g., rear brake chamber valves) and a pressure switch monitoring the parking brake valve, in addition to the active valves.

The rear brake subsystem 340 can share sensors with the front ECU, but can alternatively be connected to a separate and distinct set of sensors.

However, the rear brake subsystem 340 may be otherwise configured.

However, the brake subsystem 300 may be otherwise configured.

The steering subsystem 400 functions to generate steering inputs for the vehicle during autonomous and manual operating modes. The steering subsystem 400 can be arranged proximal the driver seat (e.g., under the driver seat), and/or otherwise located within the vehicle. The steering subsystem 400 can be arranged offset from the vehicle centerline, centered on the vehicle centerline, parallel to the vehicle centerline, perpendicular to the vehicle centerline, and/or any other suitable arrangement relative to the vehicle centerline. For example, the steering subsystem 400 can be connected to a drag link mechanism offset from the vehicle centerline, and/or any other suitable location.

The steering subsystem 400 can be controlled by the same or different ECUs as those used in the braking subsystem (e.g., front ECU, rear ECU, etc.), and/or any other suitable control units. In a specific example, the front ECU can be used as the steering ECU. The ECU can be on the same or different circuit as the braking subsystem ECUs.

The steering subsystem 400 can include a steering actuator. The steering actuator can be electrically controlled by the ECUs and/or mechanically controlled by the steering wheel. The steering actuator can function as an actuator, as a sensor (e.g., steering angle sensor, torque sensor, etc.), and/or any other suitable function. The steering subsystem 400 can include: an Electric Power Assisted Steering unit (EPAS unit), an electro-mechanical actuator, a hydraulic servo system, and/or any other suitable actuator.

The steering subsystem 400 can be redundantly powered, powered by a single power source, and/or any other suitable power configuration.

Figure 4:
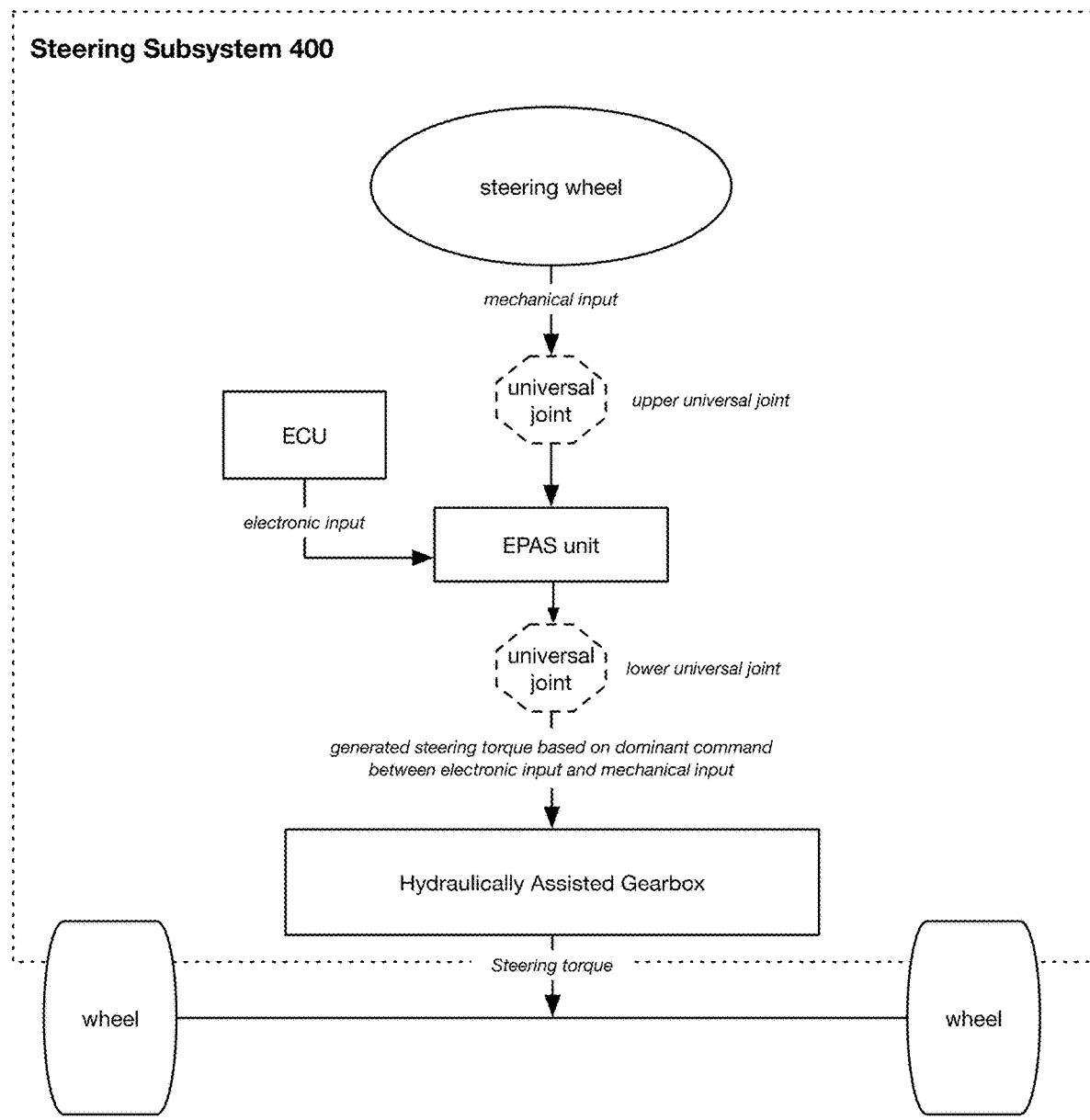
FIG. 4 is an illustrative example of a variant of a steering subsystem.
Figure 5:
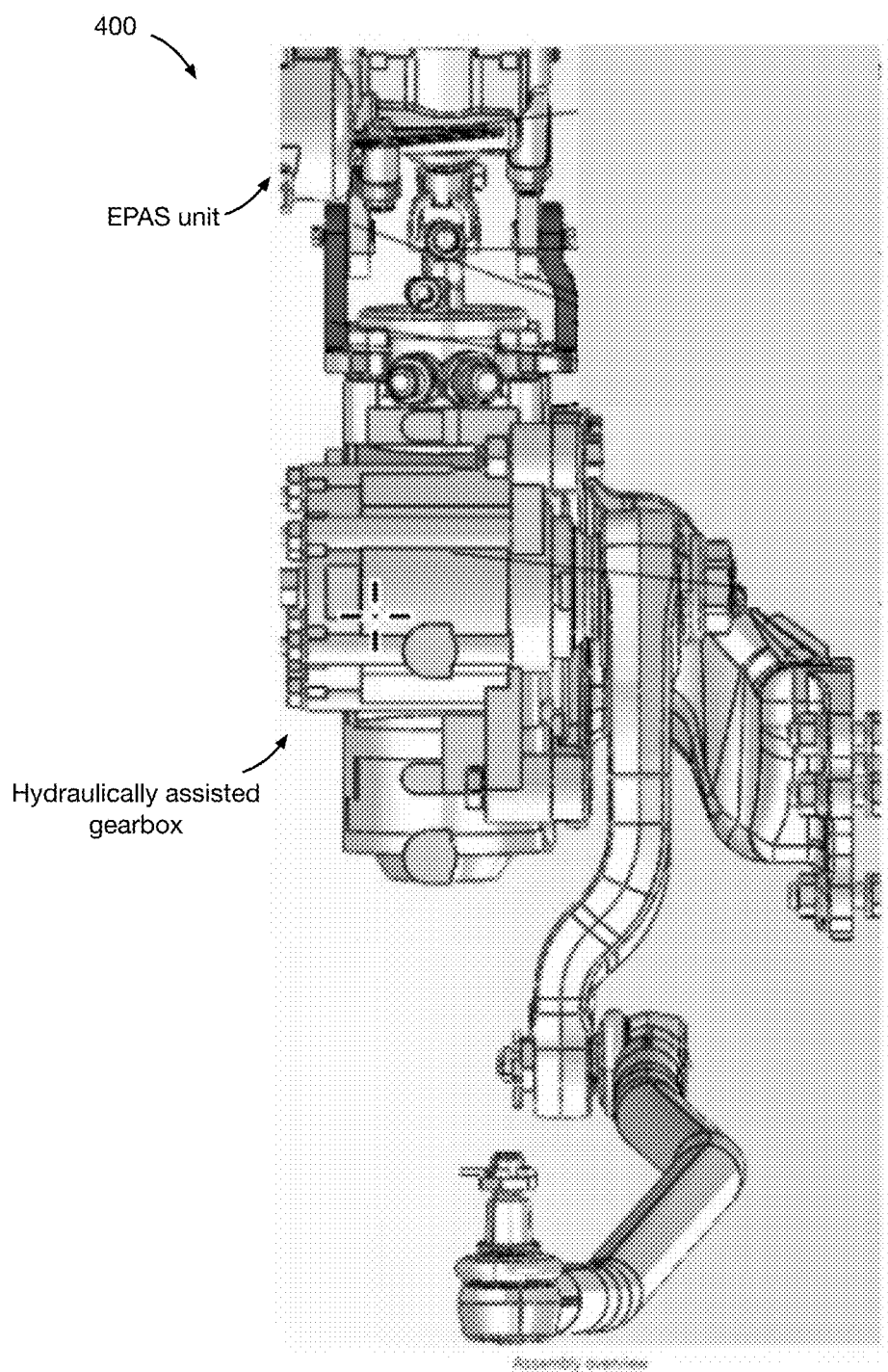
FIG. 5 is an illustrative example of a variant of a steering subsystem mechanism that allows cab tilt.
Figure 6:
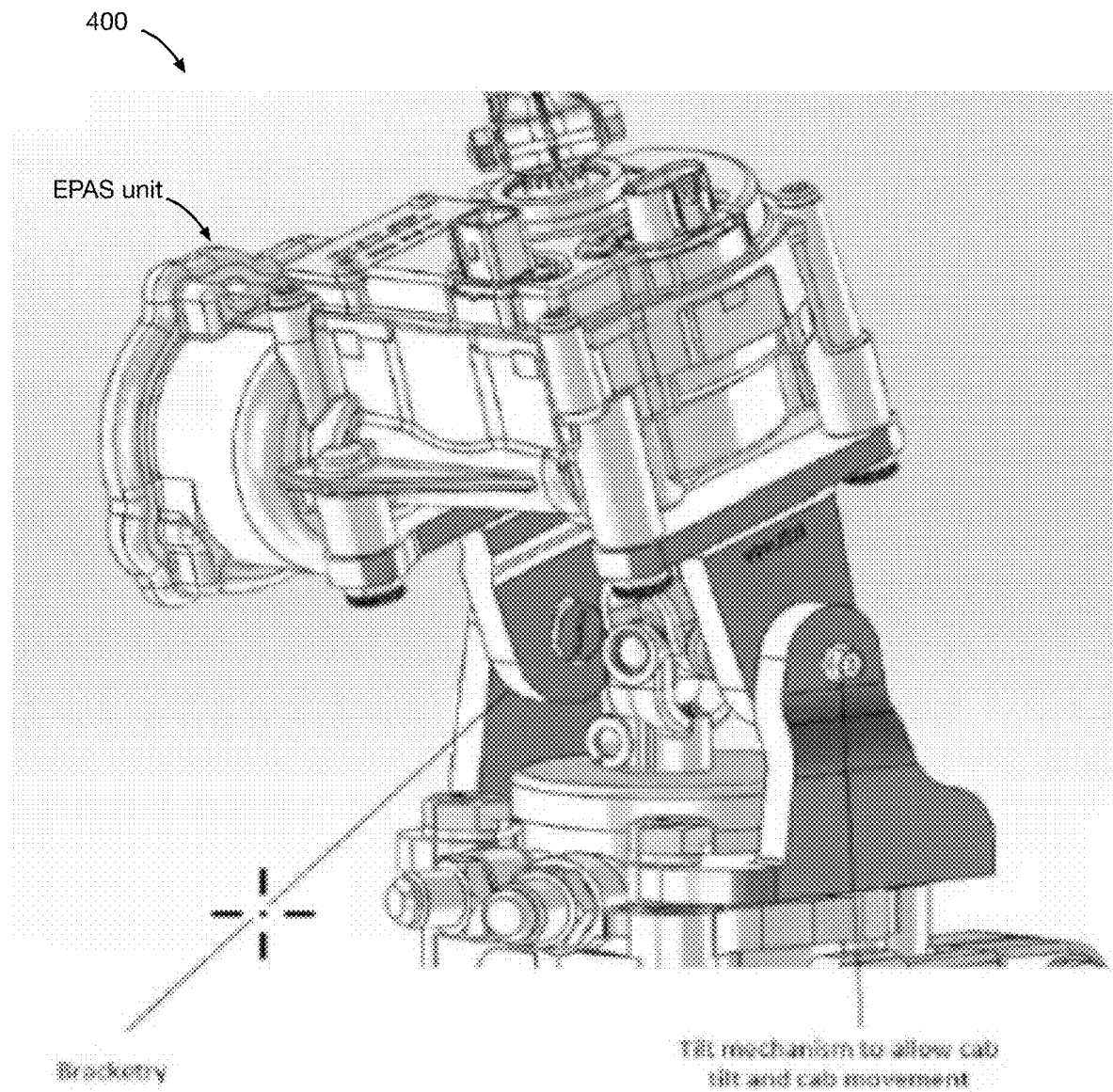
FIG. 6 is an illustrative example of a variant of a steering subsystem mechanism that allows cab tilt.

In a first variant, the steering subsystem 400 can include a tilt-telescope compliant mechanism that integrates an electronic power steering unit (e.g., electronic power assisted steering motor) inline with a hydraulic recirculating ball gearbox (e.g., examples shown in FIG. 4, FIG. 5, and FIG. 6). The electronic power assisted steering (EPAS) unit can be mechanically connected to the steering wheel at a mechanical input by an upper universal joint at an upper end and mechanically connected to a hydraulic gearbox at a mechanical output by a lower universal joint at a lower end. This configuration can enable the EPAS unit to tilt with the cab and with driver steering wheel position adjustments. In the autonomous vehicle (AV) mode, the AV system controls the electronic power steering unit to generate a torque based on the desired steering angle, wherein the torque is transferred to the hydraulic gearbox (e.g., via the lower universal joint), which actuates the axle (e.g., front axle) via a pitman arm and drag link connection assembly to the wheel carrier arm. In the manual mode, torque at the steering wheel is transferred to the mechanical input of the EPAS unit (e.g., via the upper universal joint), wherein the EPAS unit passively generates a torque at the mechanical output that is transferred to the hydraulic gearbox (e.g., via the lower universal joint).

Figure 7:
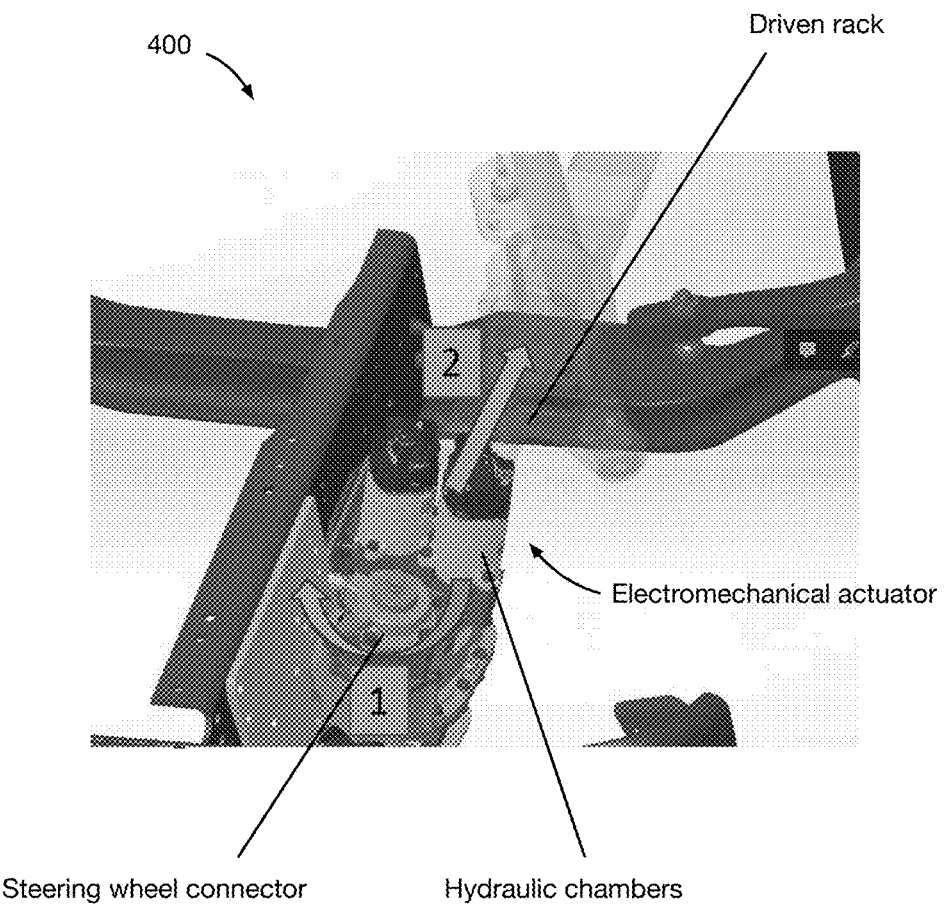
FIG. 7 is an illustrative example of a variant of the steering actuator.

In a second variant, the steering subsystem 400 can include a linear actuator mechanically connected to the wheel carrier arm (e.g., at a distal end of the linear rail) and electrically connected to the AV system (e.g., example shown in FIG. 7). The linear actuator can be a hydraulic linear actuator including a set of hydraulic chambers (e.g., cylinders) and a piston rotatably connected to a linear rail (e.g., lead screw, piston rod, etc.), wherein piston chamber pressurization drives linear rail motion. The linear actuator can include one or more rotary mechanisms (e.g., motor, EPAS motor, driven screw, etc.) driven by the set of hydraulic chambers and rotatably connected to the linear rail (e.g., lead screw, rack railway, etc.), wherein rotary mechanism rotation controls linear rail motion. Rotary mechanism rotation can be driven by the hydraulic chambers, by the steering wheel (e.g., mechanically connected to the rotary mechanism), and/or otherwise driven. Linear rail translation can push a draglink connected offset to a wheel carrier arm, which turns the wheels connected to the wheel carrier arm.

In a first example, a steering input is received at the steering wheel, a torque sensor detects a torque based on the steering input (e.g., clockwise rotation), the steering ECU(s) and/or steering actuator receives the sensed torque and generates a steering output based on the sensed torque (e.g., generates a rotational output, generates a linear actuation output, etc.) to steer the wheels.

In a second example, the AV system generates steering commands based on real-time sensor data (e.g., lane markings, obstacles) and vehicle dynamics (e.g., speed, yaw rate, etc.); these commands are sent to and processed by the steering ECU(s) to determine the steering angle and torque required; the ECU(s) send signals to the wheel actuators, which adjust the wheel angles accordingly. Sensors on the wheels provide feedback to the ECU(s) for real-time adjustments.

In a third example, in manual override mode; the vehicle operator turns the steering wheel; sensors (e.g., steering wheel angle sensor, torque sensor, etc.) capture the input (e.g., angle, torque, etc.) and send the data to the ECU(s); the ECU(s) process this input along with vehicle dynamics data (e.g., speed, yaw rate, etc.) to determine a driver override mechanism, sending the commands to the steering subsystem (e.g., steering actuation subsystem) and optionally transferring the operation of the steering mechanism to the vehicle operator as the sole steering input. However, the steering subsystem 400 may be otherwise configured.

However, the vehicle can be otherwise configured.

5. Specific Examples

Specific example 1. A vehicle, comprising a redundant brake system, comprising: a front braking subsystem, comprising: a front electronic control unit (ECU) configured to generate primary front control instructions based on a first set of inputs; a rear electronic control unit (ECU) configured to generate redundant front control instructions based on the first set of inputs; a front proportional valve comprising a data input electrically connected to the rear ECU and a pneumatic output, wherein a control signal received from the rear ECU controls a pneumatic pressure output at the pneumatic output; a solenoid comprising a first fluid inlet fluidly connected to the pneumatic output of the front proportional valve, a second fluid inlet fluidly connected to a brake pedal system, and a solenoid output, wherein a dominant pneumatic signal between the first fluid inlet and the second fluid inlet controls a pneumatic pressure output at the solenoid output; a front proportional relay valve comprising a data input electrically connected to the front ECU, a fluid inlet fluidly connected to the solenoid output, and a front brake output, wherein a dominant signal between the fluid inlet and the data input controls a brake pressure at the front brake output; and a set of front pneumatic brake chambers fluidly connected to the brake output Specific example 2. The vehicle of specific example 1, further comprising a rear braking subsystem, comprising: a rear proportional relay valve comprising a data input electrically connected to the rear ECU, a fluid inlet fluidly connected to the brake pedal system, and a rear brake output, wherein a dominant signal between the fluid inlet and the data input controls a brake pressure at the rear brake output; a set of rear brake chambers, each comprising a fluid inlet fluidly connected to the rear brake output and a spring brake; and an inversion valve comprising a first fluid inlet fluidly connected to the front brake output, a second fluid inlet fluidly connected to the rear brake output, and a spring brake output fluidly connected to the spring brakes of the set of rear brake chambers, wherein the inversion valve biases the spring brakes closed when a front brake pressure from the front brake output is higher than a rear brake pressure from the rear brake output Specific example 3. The vehicle of specific example 2, wherein the front braking subsystem is supplied by a front pressure supply, and the rear braking subsystem is supplied by a rear pressure supply Specific example 4. The vehicle of specific example 1, wherein the front ECU is electrically isolated from the rear ECU Specific example 5. The vehicle of specific example 1, wherein the front and rear ECUs are electrically connected to a vehicle power supply by a disconnect switch.

Specific example 6. The vehicle of specific example 1, further comprising a steering assembly, comprising: a steering wheel; an upper universal joint connected to the steering wheel; an Electric Power Assisted Steering unit (EPAS unit) comprising a mechanical input connected to the upper universal joint, a digital input connected to a third ECU electrically connected to the vehicle power supply by the disconnect switch, and a mechanical output, wherein a dominant signal between the mechanical input and the digital input control the mechanical output; a lower universal joint connected to the mechanical output; and a hydraulically assisted gearbox comprising a mechanical input connected to the lower universal joint and an output connected to a wheel carrier arm supporting wheels of the vehicle Specific example 7. The vehicle of specific example 1, wherein the vehicle is a cabover truck Specific example 8. A vehicle operable between an autonomous mode and a manual mode, the vehicle comprising: a braking subsystem comprising: a solenoid connected to a rear ECU, fluidly connected to a brake pedal, and comprising a solenoid output; a proportional relay valve connected to a front ECU, fluidly connected to the solenoid output, and comprising a first brake output; and a set of brake chambers fluidly connected to the first brake output; wherein: in the autonomous mode, the front and rear ECUs are electrically connected to a vehicle power source by a disconnect switch, wherein the proportional relay valve and the solenoid generate output pressures based on control signals from the front and rear ECUs, respectively; and in the manual mode, the front and rear ECUs are disconnected from the vehicle power source by the disconnect switch, wherein the first proportional relay valve and the solenoid generate output pressures based on control signals from the brake pedal and the solenoid, respectively Specific example 9. The vehicle of specific example 8, wherein the braking subsystem further comprises: a second proportional relay valve connected to the rear ECU, fluidly connected to the brake pedal, and comprising a second brake output; and a set of secondary brake chambers fluidly connected to the second brake output and mechanically connected to a set of wheels; wherein the second proportional relay valve generates an output pressure based on a control signal from the rear ECU in the autonomous mode, and generates the output pressure based on a control signal from the brake pedal in the manual mode Specific example 10. The vehicle of specific example 9, further comprising: a set of spring brakes connected to the set of wheels; and an inversion valve fluidly connected to the first and second brake outputs and the set of spring brakes, wherein the inversion valve biases the spring brakes closed when the first brake output exceeds the second brake output Specific example 11. The vehicle of specific example 8, further comprising a steering assembly, comprising: a steering wheel; an Electric Power Assisted Steering unit (EPAS unit) connected to the steering wheel and a third ECU, and comprising a mechanical output; and a hydraulic gearbox connected to the mechanical output and a wheel carrier arm supporting wheels of the vehicle; wherein the EPAS unit is controlled by a control signal output by the third ECU in the autonomous mode and controlled by a torque output by the steering wheel in the manual mode Specific example 12. The vehicle of specific example 8, further comprising a steering assembly, comprising: a steering wheel; and a hydraulically assisted gearbox, electrically controlled by a third ECU and connected to the steering wheel at a mechanical input and a draglink supporting wheels of the vehicle; wherein the hydraulically assisted gearbox is controlled by a control signal output by the third ECU in the autonomous mode and controlled by a torque output by the steering wheel in the manual mode Specific example 13. The vehicle of specific example 8, wherein the vehicle is a cabover truck Specific example 14. A vehicle comprising: a steering assembly, comprising: a steering wheel; an upper universal joint connected to the steering wheel; an Electric Power Assisted Steering unit (EPAS unit) comprising a mechanical input connected to the upper universal joint, a digital input connected to an ECU, and a mechanical output, wherein a dominant signal between the mechanical input and the digital input control the mechanical output; a lower universal joint connected to the mechanical output; and a hydraulically assisted gearbox comprising a mechanical input connected to the lower universal joint and an output connected to a draglink supporting wheels of the vehicle Specific example 15. The vehicle of specific example 14, wherein the vehicle is a cabover truck, wherein the EPAS unit tilts with a cab of the cabover truck Specific example 16. The vehicle of specific example 14, wherein the ECU is electrically connected to a vehicle power source by a disconnect switch Specific example 17. The vehicle of specific example 16, wherein the disconnect switch is mechanically connected to a driver input arranged within a cab of the vehicle Specific example 18. The vehicle of specific example 14, further comprising a redundant braking system, comprising: a front electronic control unit (ECU) configured to generate primary front control instructions; a rear electronic control unit (ECU) configured to generate redundant front control instructions; a front proportional valve comprising a data input electrically connected to the rear ECU and a pneumatic output, wherein a control signal received from the rear ECU controls a pneumatic pressure output at the pneumatic output; a solenoid comprising a first fluid inlet fluidly connected to the pneumatic output of the front proportional valve, a second fluid inlet fluidly connected to a brake pedal system, and a solenoid output, wherein a dominant pneumatic signal between the first fluid inlet and the second fluid inlet controls a pneumatic pressure output at the solenoid output; a front proportional relay valve comprising a data input electrically connected to the front ECU, a fluid inlet fluidly connected to the solenoid output, and a front brake output, wherein a dominant signal between the fluid inlet and the data input controls a brake pressure at the front brake output; and a set of front pneumatic brake chambers fluidly connected to the brake output Specific example 19. The vehicle of specific example 18, wherein the front and rear ECUs generate the primary front control instructions and the redundant front control instructions based on a common set of inputs Specific example 20. The vehicle of specific example 14, further comprising a redundant braking system, comprising: a rear proportional relay valve comprising a data input electrically connected to a rear ECU, a fluid inlet fluidly connected to a brake pedal system, and a rear brake output, wherein a dominant signal between the fluid inlet and the data input controls a brake pressure at the rear brake output; a set of rear brake chambers, each comprising a fluid inlet fluidly connected to the rear brake output and a spring brake; and an inversion valve comprising a first fluid inlet fluidly connected to a front brake line, a second fluid inlet fluidly connected to the rear brake output, and a spring brake output fluidly connected to the spring brakes of the set of rear brake chambers, wherein the inversion valve biases the spring brakes closed when a front brake pressure from the front brake line is higher than a rear brake pressure from the rear brake output.

Specific example 21. The vehicle of specific examples 6 and 11-14, wherein the front ECU functions as the steering ECU (third ECU).

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, and/or be otherwise interpreted.

Optional elements, which can be included in some variants but not others, are indicated in broken lines in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A vehicle, comprising a redundant brake system, comprising:
    a front braking subsystem, comprising:
        a front electronic control unit (ECU) configured to generate primary front control instructions based on a first set of inputs;
        a rear electronic control unit (ECU) configured to generate redundant front control instructions based on the first set of inputs;
        a front proportional valve comprising a data input electrically connected to the rear ECU and a pneumatic output, wherein a control signal received from the rear ECU controls a pneumatic pressure output at the pneumatic output;
        a solenoid comprising a first fluid inlet fluidly connected to the pneumatic output of the front proportional valve, a second fluid inlet fluidly connected to a brake pedal system, and a solenoid output, wherein a dominant pneumatic signal between the first fluid inlet and the second fluid inlet controls a pneumatic pressure output at the solenoid output;
        a front proportional relay valve comprising a data input electrically connected to the front ECU, a fluid inlet fluidly connected to the solenoid output, and a front brake output, wherein a dominant signal between the fluid inlet and the data input controls a brake pressure at the front brake output; and
        a set of front pneumatic brake chambers fluidly connected to the brake output.

2. The vehicle of claim 1, further comprising a rear braking subsystem, comprising:
    a rear proportional relay valve comprising a data input electrically connected to the rear ECU, a fluid inlet fluidly connected to the brake pedal system, and a rear brake output, wherein a dominant signal between the fluid inlet and the data input controls a brake pressure at the rear brake output;
    a set of rear brake chambers, each comprising a fluid inlet fluidly connected to the rear brake output and a spring brake; and
    an inversion valve comprising a first fluid inlet fluidly connected to the front brake output, a second fluid inlet fluidly connected to the rear brake output, and a spring brake output fluidly connected to the spring brakes of the set of rear brake chambers, wherein the inversion valve biases the spring brakes closed when a front brake pressure from the front brake output is higher than a rear brake pressure from the rear brake output.

3. The vehicle of claim 2, wherein the front braking subsystem is supplied by a front pressure supply, and the rear braking subsystem is supplied by a rear pressure supply.

4. The vehicle of claim 1, wherein the front ECU is electrically isolated from the rear ECU.

5. The vehicle of claim 1, wherein the front and rear ECUs are electrically connected to a vehicle power supply by a disconnect switch.

6. The vehicle of claim 1, further comprising a steering assembly, comprising:
a steering wheel;
an upper universal joint connected to the steering wheel;
an Electric Power Assisted Steering unit (EPAS unit) comprising a mechanical input connected to the upper universal joint, a digital input connected to a third ECU electrically connected to the vehicle power supply by the disconnect switch, and a mechanical output, wherein a dominant signal between the mechanical input and the digital input control the mechanical output;
a lower universal joint connected to the mechanical output; and
a hydraulic gearbox comprising a mechanical input connected to the lower universal joint and an output connected to a wheel carrier arm supporting wheels of the vehicle.

7. The vehicle of claim 1, wherein the vehicle is a cabover truck.

8. A vehicle operable between an autonomous mode and a manual mode, the vehicle comprising:
a braking subsystem comprising:
a solenoid connected to a rear ECU, fluidly connected to a brake pedal, and comprising a solenoid output;
a proportional relay valve connected to a front ECU, fluidly connected to the solenoid output, and comprising a first brake output; and
a set of brake chambers fluidly connected to the first brake output;
wherein:
in the autonomous mode, the front and rear ECUs are electrically connected to a vehicle power source by a disconnect switch, wherein the proportional relay valve and the solenoid generate output pressures based on control signals from the front and rear ECUS, respectively; and
in the manual mode, the front and rear ECUs are disconnected from the vehicle power source by the disconnect switch, wherein the proportional relay valve and the solenoid generate output pressures based on control signals from the brake pedal.

9. The vehicle of claim 8, wherein the braking subsystem further comprises:
a second proportional relay valve connected to the rear ECU, fluidly connected to the brake pedal, and comprising a second brake output; and
a set of secondary brake chambers fluidly connected to the second brake output and mechanically connected to a set of wheels;
wherein the second proportional relay valve generates an output pressure based on a control signal from the rear ECU in the autonomous mode, and generates the output pressure based on a control signal from the brake pedal in the manual mode.

10. The vehicle of claim 9, further comprising:
a set of spring brakes connected to the set of wheels; and
an inversion valve fluidly connected to the first and second brake outputs and the set of spring brakes, wherein the inversion valve biases the spring brakes closed when the first brake output exceeds the second brake output.

11. The vehicle of claim 8, further comprising a steering assembly, comprising:
a steering wheel;
an Electric Power Assisted Steering unit (EPAS unit) connected to the steering wheel and a third ECU, and comprising a mechanical output; and
a hydraulic gearbox connected to the mechanical output and a wheel carrier arm supporting wheels of the vehicle;
wherein the EPAS unit is controlled by a control signal output by the third ECU in the autonomous mode and controlled by a torque output by the steering wheel in the manual mode.

12. The vehicle of claim 8, further comprising a steering assembly, comprising:
a steering wheel; and
a hydraulically assisted gearbox, electrically controlled by a third ECU and connected to the steering wheel at a mechanical input and a wheel carrier arm supporting wheels of the vehicle;
wherein the hydraulically assisted gearbox is controlled by a control signal output by the third ECU in the autonomous mode and controlled by a torque output by the steering wheel in the manual mode.

13. The vehicle of claim 8, wherein the vehicle is a cabover truck.

14. A vehicle comprising:
a steering assembly, comprising:
a steering wheel;
an upper universal joint connected to the steering wheel;
an Electric Power Assisted Steering unit (EPAS unit) comprising a mechanical input connected to the upper universal joint, a digital input connected to a front ECU, and a mechanical output, wherein a dominant signal between the mechanical input and the digital input control the mechanical output;
a lower universal joint connected to the mechanical output; and
a hydraulic gearbox comprising a mechanical input connected to the lower universal joint and an output connected to a wheel carrier arm supporting wheels of the vehicle; and
a redundant braking system, comprising:
a rear proportional relay valve comprising a data input electrically connected to a rear ECU, a fluid inlet fluidly connected to a brake pedal system, and a rear brake output, wherein a dominant signal between the fluid inlet and the data input controls a brake pressure at the rear brake output;
a set of rear brake chambers, each comprising a fluid inlet fluidly connected to the rear brake output and a spring brake; and
an inversion valve comprising a first fluid inlet fluidly connected to a front brake line, a second fluid inlet fluidly connected to the rear brake output, and a spring brake output fluidly connected to the spring brakes of the set of rear brake chambers, wherein the inversion valve biases the spring brakes closed when a front brake pressure from the front brake line is higher than a rear brake pressure from the rear brake output.

15. The vehicle of claim 14, wherein the vehicle is a cabover truck, wherein the EPAS unit tilts with a cab of the cabover truck.

16. The vehicle of claim 14, wherein the front ECU is electrically connected to a vehicle power source by a disconnect switch.

17. The vehicle of claim 16, wherein the disconnect switch is mechanically connected to a driver input arranged within a cab of the vehicle.

18. The vehicle of claim 14, wherein the redundant braking system further comprises:
- a front proportional valve comprising a data input electrically connected to the rear ECU and a pneumatic output, wherein a control signal received from the rear ECU controls a pneumatic pressure output at the pneumatic output;
- a solenoid comprising a first fluid inlet fluidly connected to the pneumatic output of the front proportional valve, a second fluid inlet fluidly connected to a brake pedal system, and a solenoid output, wherein a dominant pneumatic signal between the first fluid inlet and the second fluid inlet controls a pneumatic pressure output at the solenoid output;
- a front proportional relay valve comprising a data input electrically connected to the front ECU, a fluid inlet fluidly connected to the solenoid output, and a front brake output, wherein a dominant signal between the fluid inlet and the data input controls a brake pressure at the front brake output; and
- a set of front pneumatic brake chambers fluidly connected to the brake output.

19. The vehicle of claim 14, wherein the front ECU generates primary front control instructions and the rear ECU generates redundant front control instructions, wherein the primary front control instructions and the redundant front control instructions are based on a common set of inputs.

* * * * *

UNITED STATES PATENT AND TRADEMARK OFFICE
CERTIFICATE OF CORRECTION

| | | |
|---|---|---|
| PATENT NO. | : 12,409,824 B1 | Page 1 of 1 |
| APPLICATION NO. | : 18/990966 | |
| DATED | : September 9, 2025 | |
| INVENTOR(S) | : Alexander Schmitt et al. | |

It is certified that error appears in the above-identified patent and that said Letters Patent is hereby corrected as shown below:

In the Claims

Column 19, Line 49, In Claim 8, delete "ECUS," and insert --ECUs,-- therefor

Signed and Sealed this
Fourteenth Day of October, 2025

John A. Squires
*Director of the United States Patent and Trademark Office*